Figure 1:
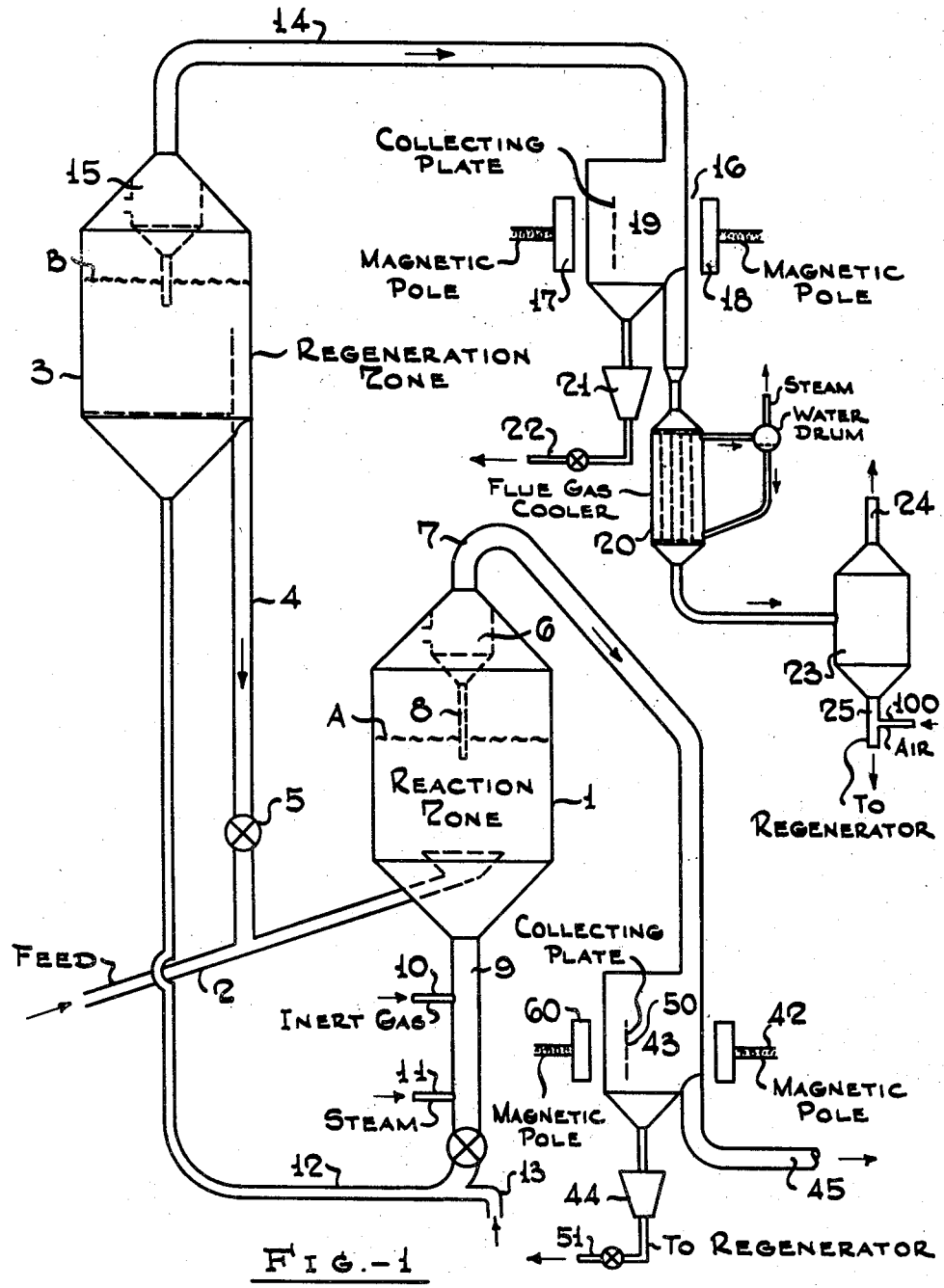

May 24, 1949. H. J. OGORZALY 2,471,078
CATALYST QUALITY BY MAGNETIC SEPARATION
Filed June 12, 1946 2 Sheets-Sheet 2

Henry J. Ogorzaly Inventor
by P. J. Whelan Attorney

Patented May 24, 1949

2,471,078

UNITED STATES PATENT OFFICE

2,471,078

CATALYST QUALITY BY MAGNETIC SEPARATION

Henry J. Ogorzaly, Summit, N. J., assignor to Standard Oil Development Company, a corporation of Delaware Application June 12, 1946, Serial No. 676,236

5 Claims. (Cl. 196—52)

The present invention is concerned with a fluid catalytic process. It is more particularly concerned with a method for reducing catalyst contamination and is specifically directed to an improved process for the reduction of catalyst contamination in a fluid catalytic oil cracking operation. In accordance with my invention, contamination of the catalyst is maintained at a relatively low level by magnetic separation means. This magnetic separation means is utilized to subject the regenerator and the reactor outlet streams to a magnetic field in order to remove undesirable particles from the respective streams.

It is well known in the art to conduct various reactions using a fluid catalyst. In these reactions, the catalyst generally comprises particles having a particle size in the range of from about 5 to 160 microns and higher. These catalyst particles are generally suspended in a fluid state by means of the superficial velocity of the upflowing gases. In general, the upper levels of the catalyst beds in the reaction and regeneration zones are maintained at a predetermined level. The feed gases are passed upwardly through the catalyst bed in the reaction zone and withdrawn through a cyclone separator wherein catalyst particles are separated from the reactant gases. In operations of this character it has been found that, due to the effect of fluid solid catalyst particles impinging on the metallic iron surfaces of the reaction equipment, the catalyst takes up impurities which comprise small particles of iron. For example, it has been found that cracking catalysts, such as, a silica-alumina catalyst, a silica-magnesia catalyst, or an activated clay catalyst, show an appreciable increase in their iron content in a relatively short time period. This increase in iron content is particularly undesirable, because of the fact that with continued mechanical agitation the small iron particles are incorporated into the catalyst and markedly alter its characteristics. Not only is the productive activity of the catalyst lowered, but also a very large increase in the yields of gas and coke occur.

I have now discovered a process by which these iron particles are readily removed from the catalyst before they are closely incorporated into the catalyst. By operating in accordance with my process the contamination of the catalyst is maintained at a relatively low value. In accordance with my invention, the reactant gases removed from the reaction zone, and the regeneration gases removed from the regeneration zone are subjected to magnetic fields under conditions to remove the undesirable iron particles. By operating in this manner, the active catalyst is maintained in a high state of purity and activity.

Figure 2:
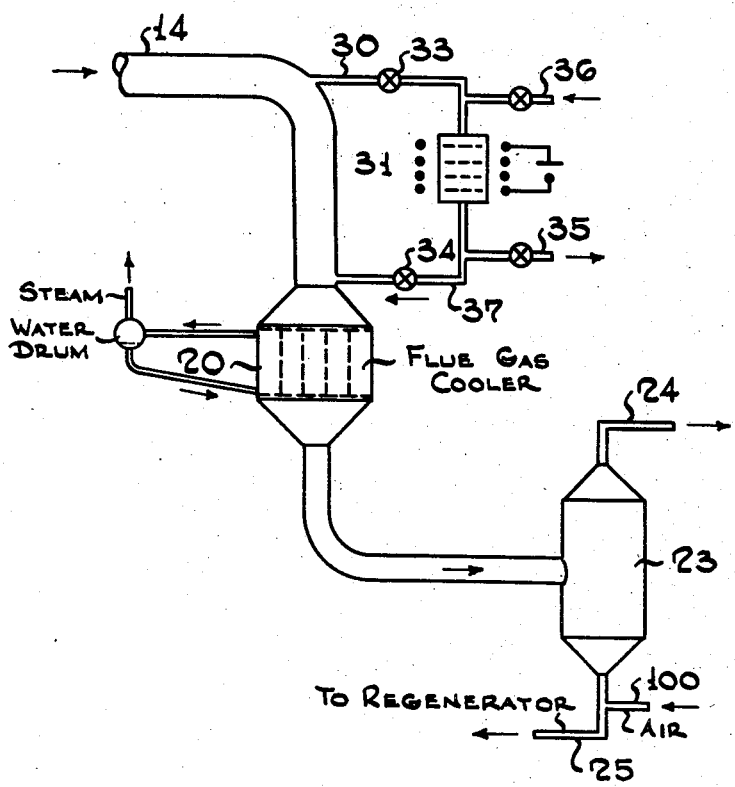

The process of my invention may be readily understood by reference to the attached drawings illustrating modifications of the same. Figure 1 illustrates a modification of my invention wherein the gases removed overhead from the regeneration zone, and from the reaction zone are passed directly through magnetic means under conditions to remove undesirable particles comprising iron. Figure 2 illustrates a modification of my invention wherein a portion of these gases are segregated from the main stream and passed through magnetic means under conditions to remove the undesirable particles comprising iron.

Referring specifically to Figure 1, it is assumed, for the purpose of illustration, that the reaction is a catalytic cracking process wherein a catalyst comprising silica-alumina or silica-magnesia is utilized. It is also assumed that the fluid catalyst comprises particles having a micron size in the range from about 5 to 160 microns. Feed gases comprising hydrocarbon constituents boiling in the gas-oil boiling range of from about 400° F. to 1000° F. and higher, are introduced into reaction zone 1 by means of feed line 2. Fluid catalyst is withdrawn from regeneration zone 3 by means of line 4 and introduced into the feed vapors in line 2. The amount of catalyst introduced into feed line 2 is controlled by control valve 5. Temperature and pressure conditions in reaction zone 1 are maintained at the desired level in order to secure the desired reaction.

The upper level of the dense catalyst phase in reaction zone 1 is maintained at point A. After a sufficient time of contact with the catalyst, the reactant vapors pass through cyclone separator means 6 and are removed overhead by means of line 7. Catalyst particles are separated in cyclone separation means 6 and are returned to the dense catalyst phase by means of return line 8. Reaction zone 1 contains a stand-pipe arrangement 9 into which inert gas or steam is introduced by means of lines 10 and 11 in order to maintain the catalyst in a fluid condition and to accomplish stripping of the catalyst. The catalyst is passed from standpipe 9 by means of line 12 into regeneration zone 3. It is the usual practice to introduce air or another oxygen-containing gas in the catalyst line 12 by means of line 13. Temperature and pressure conditions in regeneration zone 3 are maintained to secure the desired regeneration of the catalyst. The regenerated catalyst is returned to reaction zone 1 by means of lines 4 and 2 as described. The upper layer of the dense catalyst phase in regeneration zone 3 is maintained at point B. The combustion gases are removed overhead from regeneration zone 3 by means of line 14 and handled in a manner as hereinafter described.

As pointed out heretofore, due principally to erosion of the metallic iron equipment by the solid impinging catalyst particles, constant contamination of the catalyst occurs and results in an appreciable increase in the iron content of the catalyst. I have also found that the undesirable iron particles tend to be small fines which are not readily separable in the cyclone equipment means. Thus, as the combustion gases pass through the cyclone separation zone 15, maintained in the upper section of the regeneration zone 3, small particles of catalyst and small fine particles comprising iron are preferentially removed overhead by means of line 14. Thus, the iron and iron-oxide content of the catalyst stream at this point in the system is relatively high because of this concentration of the iron fines.

In accordance with my invention I pass this overhead stream of gases from regeneration zone 3 through magnetic separation means 16. Magnetic separation means 16 comprises magnetic poles 17 and 18, and a collecting plate 19. As the combustion gases and the catalyst fines flow directly through magnetic means 16 the fine undesirable iron particles, due to an imposed electro-magnetic field, are attracted to collecting plate 19. The non-magnetic catalyst particles and gases flow through the magnetic separation means 16, and are passed through cooling means 20 which, for the purpose of illustration, comprises a steam boiler. At intervals the current may be cut off and the iron particles on collecting plate 19 removed, passed into bin 21 and removed from the system by means of line 22. The cool gases containing the non-magnetic catalyst fines are passed into additional separation means 23 which, for the purpose of illustration, is assumed to be a Cottrell separator. In separation means 23, the fine active catalyst particles are separated from the gases which are removed overhead by means of line 24. The catalyst fines are removed from separation means 23 by means of line 25, fluidized with air introduced by means of line 100, and are preferably recirculated to the regeneration zone.

In a similar manner reactant gases are removed from the reaction zone 1 by means of line 7. The reactant gases are passed through cyclone separation means 6 maintained in the upper section of reaction zone 1. Substantially all the catalyst is removed from the gases in cyclone separation zone 6 and returned to the main catalyst bed by means of line 8. However, small undesirable iron particles and small catalyst fines are not completely removed and are thus removed overhead by means of line 7 with the reactant gases. In accordance with my invention I pass these reactant gases containing the small undesirable particles comprising iron and the catalyst fines through the electro-magnetic separation means 43. Electro-magnetic separation means 43 comprises magnetic poles 42 and 60, and a collecting plate 50. As the reactant gases flow through electro-magnetic means 43 the iron particles, due to the imposed electro-magnetic field, are attracted to collecting plate 50 while the non-magnetic gases and catalyst particles flow through electro-magnetic means 43 and are removed by means of line 45. The non-magnetic catalyst fines may be removed from the reactant gases by any suitable means such as that described with respect to the combustion gases. At intervals, the electro-magnetic field may be demagnetized by cutting off the current and the iron particles on collecting plate 50 removed, passed to bin 44 and removed from the system by means of line 51.

Referring specifically to Figure 2 illustrating a preferred modification of my invention, the combustion gases removed by means of line 14 are segregated into two streams. One stream of these gases is withdrawn as a side stream by means of line 30. This side stream of combustion gases is passed through magnetic separation means 31. Magnetic separation means 31 comprises a vessel subjected to an electro-magnetic field which is induced by coils 32. Magnetic separation means 31 contains therein iron or equivalent plates which are magnetized by the electro-magnetic field superimposed by the electric coils. The iron means within vessel 31 may comprise perforated plates, woven screens, grids, and the like. In general, it is desirable to have a large free area within means 31 combined with a tortuous path imposed upon the flowing gases containing the catalyst fines and the undesirable particles comprising iron. As the gases containing these iron particles flow through means 31 the iron particles contact the magnetized iron surfaces and are held on the surfaces. The non-magnetic catalyst particles and the gases flow through electro-magnetic means 31, are removed by means of line 37. and re-introduced into line 14 by means of valve 34. After a sufficient time of contact, valves 33 and 34 may be blanked off and magnetic means 31 demagnetized and then freed of iron particles which have collected on the iron surfaces. Undesirable iron particles removed from the gases may be removed from the electro-magnetic means 31 by blowing with a gaseous medium which is introduced by means of line 35 and withdrawn by means of line 36. It is to be understood that a number of parallel electro-magnetic means 31 may be employed so that a continuous removal of iron particles may be secured.

The side stream of the gases treated as described and returned to the main stream in line 14 are passed to cooling zone 20 and then into further separation means 23 as described with respect to the description of Figure 1.

The process of my invention may be varied within the limits described. The invention generally covers a process for the removal of particles comprising iron from a catalyst containing the same. It is particularly applicable in a fluid type operation, especially in a catalytic cracking operation, wherein the fine iron particles contaminating the catalyst are produced principally by the erosion of the cracking equipment. The process of my invention may be utilized over a relatively wide range of temperature and pressure operating conditions. It also may be applied wherein any type of non-magnetic active catalyst is utilized. In catalytic cracking operations the temperatures maintained in the reaction zone may vary from about 500° F. to 1200° F. Although the preferred modification is to use my invention in connection with gases removed from the regeneration zone, it may equally be applicable in the removal of iron from the reactant gases removed from the reaction zone. A preferred modification of my invention is to pass all, or a portion of the gases, through a magnetized layer of iron upon which the undesirable iron particles are collected on the magnetized surfaces. My invention is particularly desirable with respect to treating the gases removed from the regeneration or cracking zones in a catalytic cracking operation employing a silica-alumina or a silica-magnesia catalyst.

In the regeneration zone of a catalytic cracking operation, the temperatures of regenerations are generally in the range from about 800° F. to 1200° F., usually about 1000° F. to 1100° F. In the cracking zone the temperatures range from about 850° F. to 1000° F. and are generally about 900° F. to 950° F. These temperatures are most desirable for subjecting the gases to the electro-magnetic field for the removal of iron particles. This is readily apparent by reference to the following table which shows the effect of temperature on the magnetic field strength.

[Field strength, 1.0 oersted]

| Temp., °F. | Permeability C. G. S. Units |
|---|---|
| 300 | 950 |
| 500 | 1,500 |
| 700 | 2,700 |
| 900 | 6,900 |
| 1,100 | 6,800 |
| 1,300 | 6,200 |
| 1,500 | Approximately 1 |

The process of my invention is not to be limited by any theory as to the mode of operation; but only in and by the following claims.

I claim:

1. Improved catalytic cracking operation which comprises maintaining a fluid bed of non-magnetic catalyst particles in a reaction zone, passing feed gases through said bed under cracking conditions, removing hot reactant vapors from said reaction zone and separating substantially all the catalyst from said vapors, thereafter passing at least a portion of said hot vapors containing only small residual amounts of active catalyst fines and undesirable particles comprising iron through a segregation zone, imposing an electro-magnetic field in said segregation zone whereby the particles comprising iron are separated from said vapors and from said small residual amounts of active catalyst fines.

2. Process as defined by claim 1 in which the vapors and solid materials passed through said segregation zone are at a temperature in the range from about 850° F. to 1000° F.

3. Improved catalytic cracking operation which comprises maintaining fluid beds of non-magnetic catalyst particles in a reaction zone and in a regeneration zone, passing hydrocarbon feed gases through said reaction zone under cracking conditions, removing reaction gases from said reaction zone and separating reaction products, continuously passing catalyst from said reaction zone to said regeneration zone, and from said regeneration zone to said reaction zone, subjecting said fluid catalyst in said regeneration zone to oxygen containing gases under combustion conditions, withdrawing from said regeneration zone hot combustion gases, and removing therefrom substantially all the regenerated catalyst, thereafter passing at least a portion of said hot combustion gases containing only residual amounts of small particles of active catalyst and small undesirable particles comprising iron through a segregation zone, imposing an electromagnetic field in said segregation zone under conditions to separate the undesirable particles comprising iron from the combustion gases and the active catalyst particles, removing the combustion gases substantially free of iron particles and containing active catalyst particles from said segregation zone, separating the active catalyst particles from said combustion gases and returning the same to the catalytic cracking operation.

4. Process as defined by claim 3 in which the combustion gases are passed through said segregation zone at a temperature in the range from about 800° F. to about 1200° F.

5. In a catalytic cracking process wherein a dense, turbulent bed of finely divided catalyst particles is maintained in at least one hot iron reaction vessel, a gas is passed upwardly through the bed under reaction conditions such that the catalyst becomes contaminated with small particles containing iron, a hot stream of gas containing suspended particles is removed from near the top of the reaction zone and a major proportion of the suspended particles is separated from said stream in a separating region, the improvement comprising passing at least a portion of the said hot stream after separation of the major proportion of the suspended particles and containing only small residual amounts of entrained catalyst fines and iron contaminants through a segregation zone, imposing a magnetic field in said segregation zone transversely to said stream whereby the contaminants are segregated from the hot stream, and separately withdrawing the iron-containing contaminants and a stream of gas containing catalyst fines.

HENRY J. OGORZALY.

REFERENCES CITED

The following references are of record in the file of this patent:

UNITED STATES PATENTS

| Number | Name | Date |
|---|---|---|
| 1,290,241 | Kohler | Jan. 7, 1919 |
| 1,799,858 | Miller | Apr. 7, 1931 |
| 2,348,418 | Roesch et al. | May 9, 1944 |
| 2,350,759 | Hilmer et al. | June 6, 1944 |

OTHER REFERENCES

Murphree et al.: Nat. Pet. News, March 7, 1945, pages 194 et seq. (7 pages).

Ewing: "Magnetic Induction etc.," pages 164 to 167, Van Nostrand Co., 1892.